United States Patent
Lai et al.

(10) Patent No.: US 11,333,533 B2
(45) Date of Patent: May 17, 2022

(54) GRATING MEASURING MODULE AND MICRO-DISPLACEMENT MEASUREMENT DEVICE

(71) Applicant: TRIPLE WIN TECHNOLOGY (SHENZHEN) CO. LTD., Shenzhen (CN)

(72) Inventors: Wen-Ching Lai, New Taipei (TW); Chao-Yu Qin, Guangdong (CN); Yu-An Cho, New Taipei (TW)

(73) Assignee: TRIPLE WIN TECHNOLOGY (SHENZHEN) CO. LTD., Shenzhen (CN)

(*) Notice: Subject to any disclaimer, the term of this patent is extended or adjusted under 35 U.S.C. 154(b) by 233 days.

(21) Appl. No.: 16/842,324

(22) Filed: Apr. 7, 2020

(65) Prior Publication Data

US 2021/0285800 A1    Sep. 16, 2021

(30) Foreign Application Priority Data

Mar. 16, 2020   (CN) .......................... 202010182848.6

(51) Int. Cl.
*G01D 5/347*   (2006.01)
*G05B 19/406*  (2006.01)

(52) U.S. Cl.
CPC ....... *G01D 5/34746* (2013.01); *G05B 19/406* (2013.01)

(58) Field of Classification Search
CPC ...... G01D 5/34746; G01D 5/38; G01D 5/366; G05B 19/406; G05B 2219/37096; G05B 2219/37177; G02B 27/4255; G06T 7/521; G01S 17/89; G01S 17/42; G01S 7/481; G01B 11/2527

USPC .......................................... 356/601–624, 373
See application file for complete search history.

(56) References Cited

U.S. PATENT DOCUMENTS

| | | | | | |
|---|---|---|---|---|---|
| 3,153,111 | A | * | 10/1964 | Barber | G01D 5/38 356/618 |
| 5,323,001 | A | * | 6/1994 | Igaki | G01D 5/36 250/231.16 |
| 5,981,941 | A | * | 11/1999 | Takata | G01D 5/38 250/231.16 |
| 6,154,278 | A | * | 11/2000 | Ito | G01D 5/38 356/499 |
| 7,714,273 | B2 | * | 5/2010 | Saendig | G01D 5/24438 250/231.13 |
| 2014/0092393 | A1 | * | 4/2014 | Oyama | G01B 9/02 356/499 |

(Continued)

*Primary Examiner* — Isiaka O Akanbi
(74) *Attorney, Agent, or Firm* — ScienBiziP, P.C.

(57) ABSTRACT

A grating measuring module includes a light source, a collimating device, a first grating, a second grating, and an image sensing chip. The first grating is arranged on an optical path of the collimating device and the second grating is arranged on an optical path of the first grating. Each of the two gratings comprises a first pattern and a plurality of second patterns locating at the both sides of the first pattern. The first and second gratings can each be attached to an object which may be displaced in relation to another object, so allowing light of a certain pattern to pass depending on the magnitude of the displacement. The image sensing chip arranged on an optical path from the second grating receives light emitted from the light source and forms an image from which a displacement can be calculated and displayed.

18 Claims, 8 Drawing Sheets

(56) References Cited

U.S. PATENT DOCUMENTS

2016/0341576 A1\* 11/2016 Hickman MaCcoy ...................... G01D 5/34792
2021/0255374 A1\* 8/2021 Murakami ............. G02B 27/44

\* cited by examiner

GRATING MEASURING MODULE AND MICRO-DISPLACEMENT MEASUREMENT DEVICE

FIELD

The subject matter herein generally relates to optical devices, in particular to a grating measuring module and a structured light projection device.

BACKGROUND

A grating meter (grating measuring module) is used to detect coordinates of cutter or workpiece or a machine tool. It is common in CNC machine tools to observe whether there is an error in the tools, for applying compensation for any error in the movement of the tools. Therefore, the grating meter is used in precision machining by machine tools. A working principle of a traditional grating measuring module is that light emitted from a light source is received by a photodetector after passing through the main grating and auxiliary grating, and then the photodetector converts the light and dark stripes of moire fringes generated by the main and auxiliary gratings into different magnitudes of current. Then a data processing unit converts the change of the current into a digital current to calculate a displacement. The photodetector is however susceptible to electromagnetic interference when receiving optical signals, leading to measurement errors.

BRIEF DESCRIPTION OF THE DRAWINGS

Implementations of the present technology are described, by way of embodiments, with reference to the attached figures.

DETAILED DESCRIPTION

Figure 1:
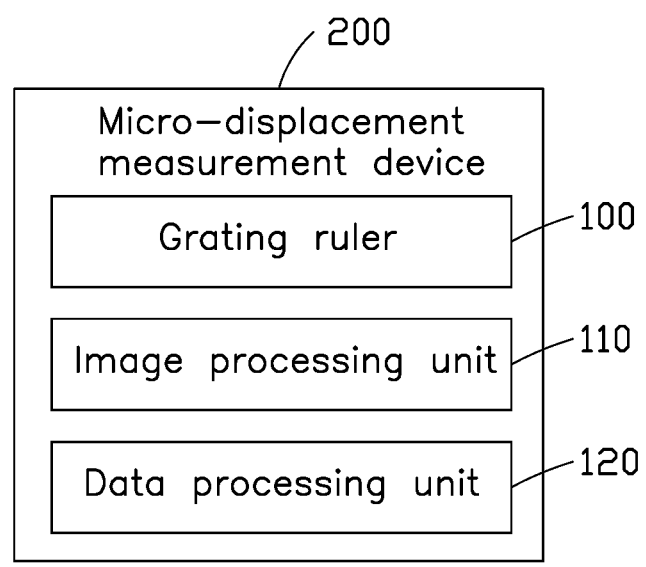
FIG. 1 is a function architecture of an embodiment of a micro-displacement measurement device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain portions may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

FIG. 1 illustrates a measuring device (micro-displacement measurement device 200) according to a first embodiment. The micro-displacement measurement device 200 includes a grating measuring module 100, an image processing unit 110, and a data processing unit 120. The image processing unit 110 and the data processing unit 120 may be integrated on a circuit board and mounted inside the grating measuring module 100, or may be located outside the grating measuring module 100. For example, the image processing unit 110 and the data processing unit 120 may be integrated in a computer.

Figure 4:
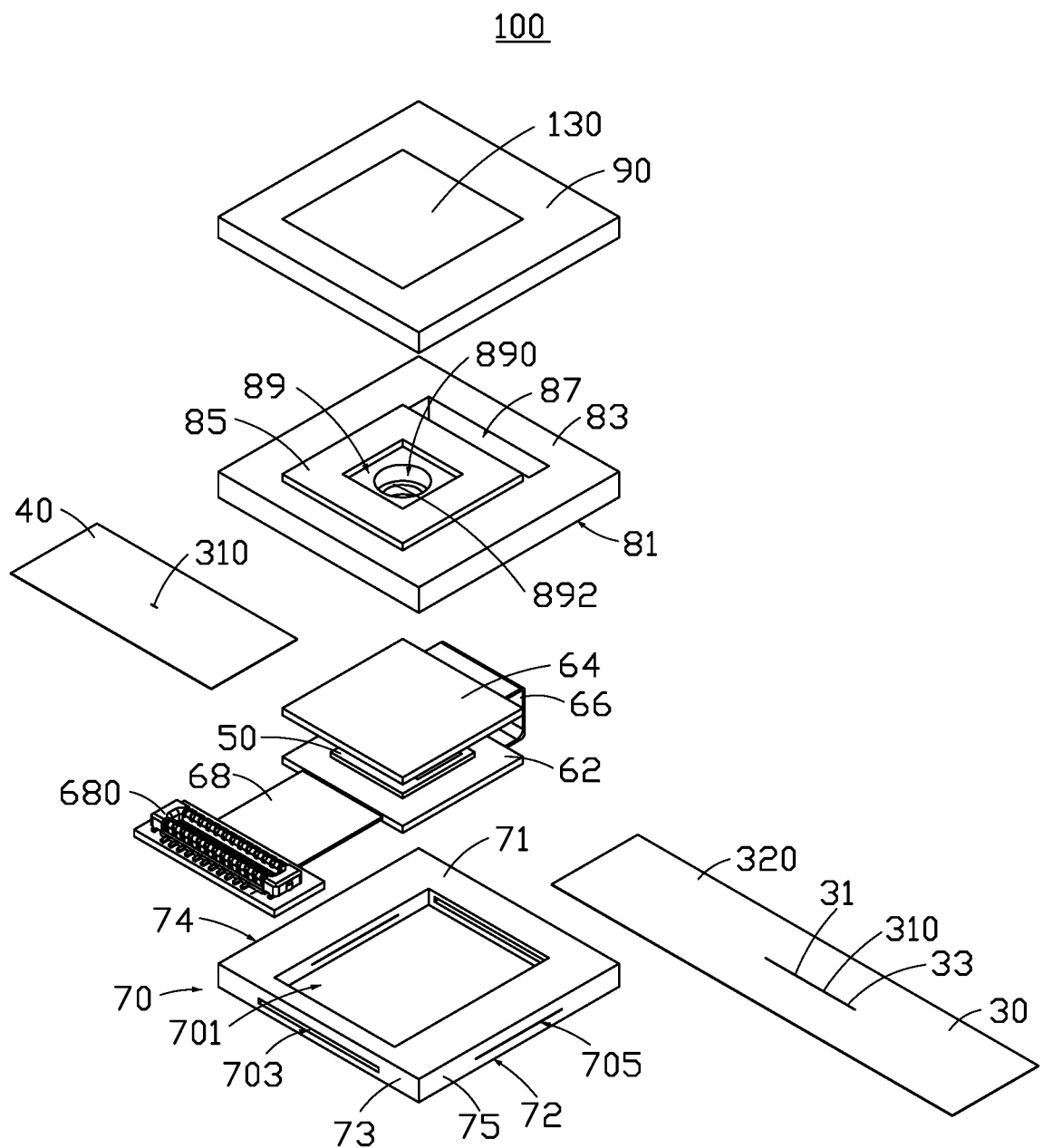
FIG. 4 is an exploded view of the grating measuring module comprised in the three-dimensional image sensing apparatus in accordance with one embodiment.
Figure 7:
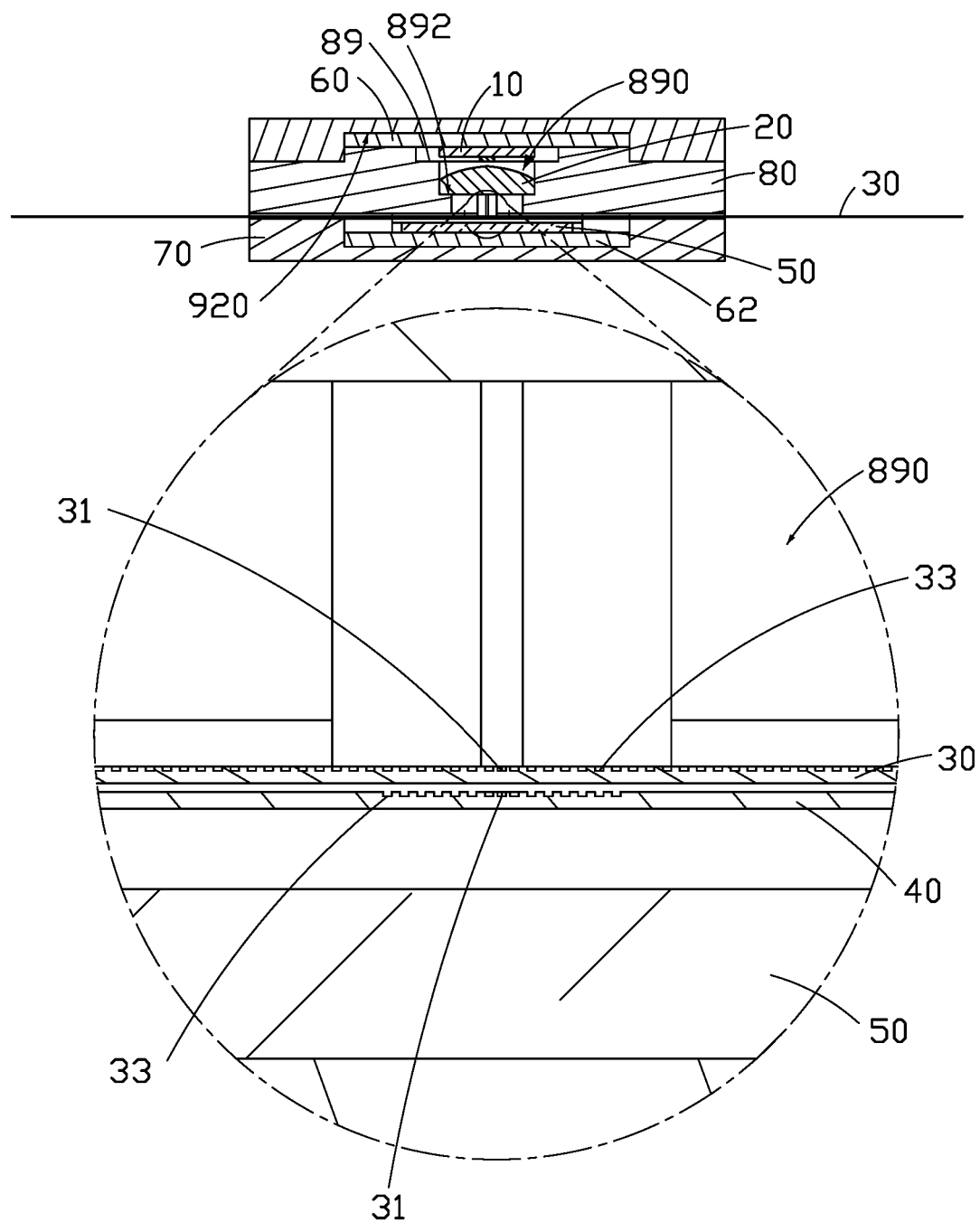
FIG. 7 is a cross-sectional view of the grating measuring module along line VII-VII in FIG. 2.

Referring to FIG. 4 and FIG. 7, the grating measuring module 100 includes a light source 10, and a collimating device 20, a first grating 30, a second grating 40, and an image sensing chip 50 that are sequentially arranged on an optical path from the light source 10.

The light source 10 may be a light emitting diode or a laser diode. In this embodiment, a laser diode (LD) is selected because of a high degree of collimation of light beam emitted by the laser diode.

The collimating device 20 may be a lens, an optical fiber, or a light pipe.

Figure 6:
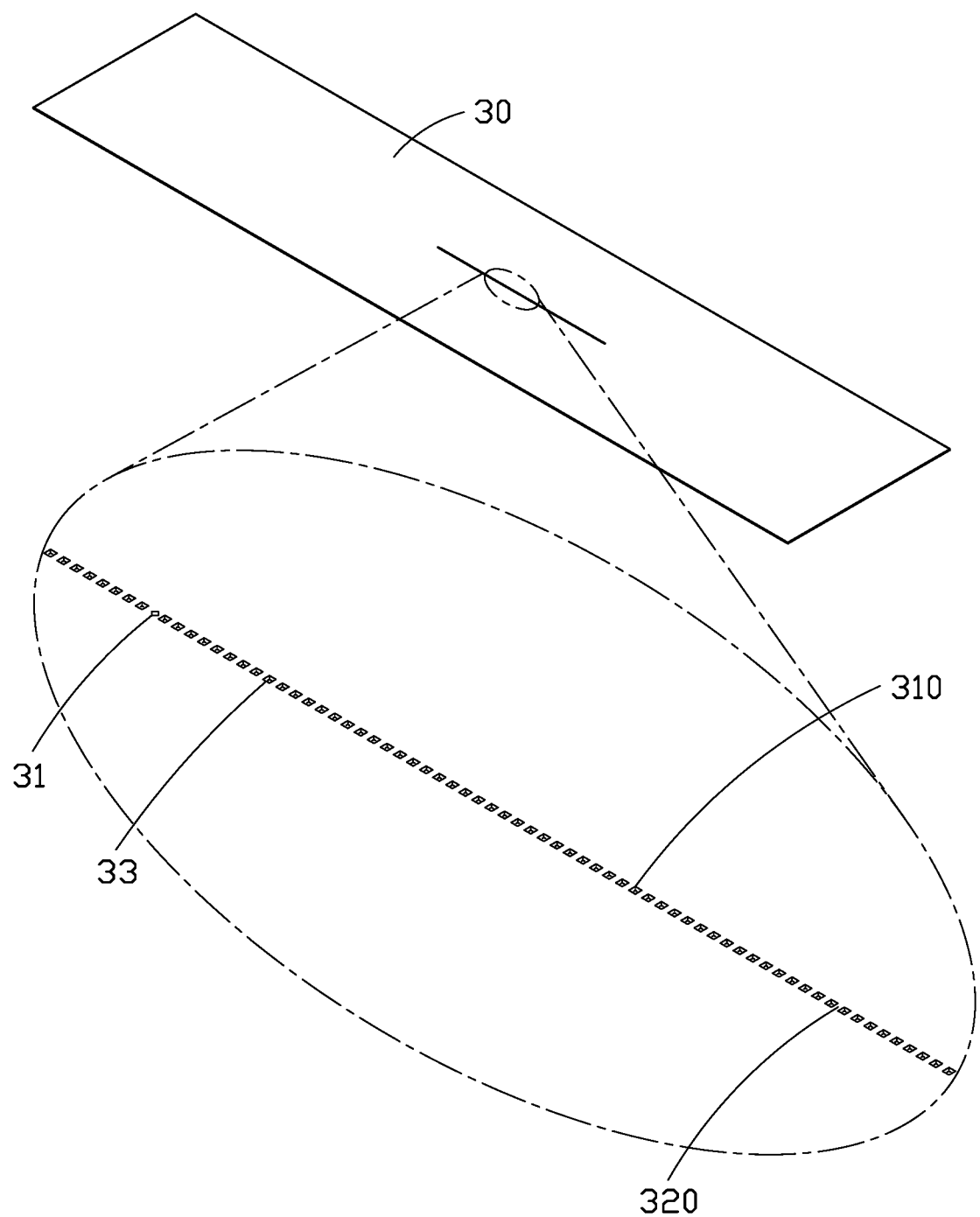
FIG. 6 is an isometric view of a first grating comprised in the grating measuring module comprised in the three-dimensional image sensing apparatus in accordance with one embodiment.

Referring to FIG. 6 and FIG. 7, a structure of the first grating 30 is similar to a structure of the second grating 40. In the embodiment, the first grating 30 and the second grating 40 respectively include a first pattern 31 and a plurality of second patterns 33 beside the left and the right of the first pattern 31. The first grating 30 and the second grating 40 can move in relation to each other. The first grating 30 may be fixed while the second grating 40 can move relative to the first grating 30, or the second grating 40 may be fixed and the first grating 30 can move relative to the second grating 40.

When the first grating 30 is fixed, and the second grating 40 is moved, only the first pattern 31 is formed on the second grating 40. The first pattern 31 on the first grating 30 and the first pattern 31 on the second grating 40 are used to determine a displacement or a range of displacement between the first grating 30 and the second grating 40.

Light emitted from the light source 10 forms an image on the image sensing chip 50 after passing through the collimating device 20, the first grating 30, and the second grating 40. The image processing unit 110 is configured to process the image formed by the image sensing chip 50, the data processing unit 120 is configured to calculate a magnitude of displacement according to a result from the image processing unit 110.

Figure 8:
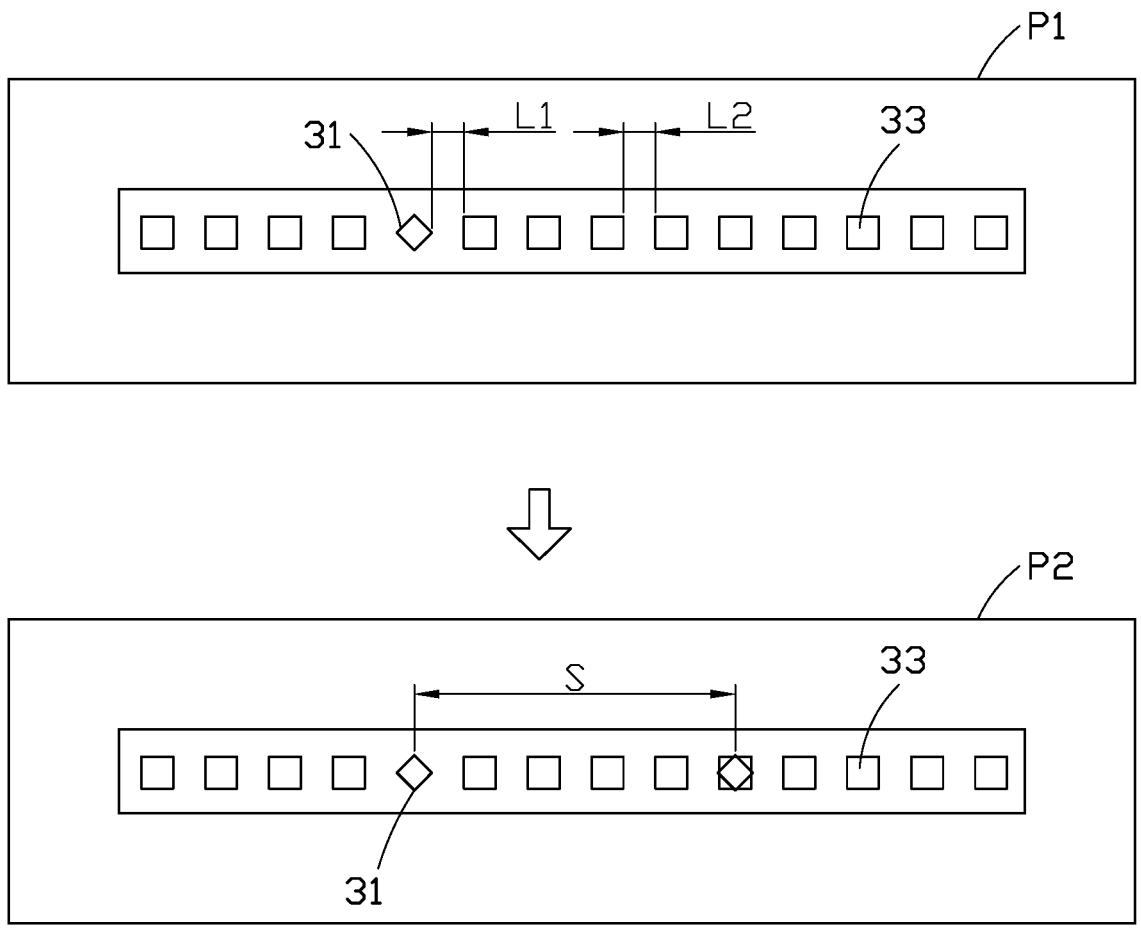
FIG. 8 is a diagram illustrating principle of measuring displacement by the grating measuring module.

Referring to FIG. 8, a first pitch L1 between the first pattern 31 and an adjacent second pattern 33 is equal to a second pitch L2 between every two adjacent second patterns 33. For example, the first pitch L1 can be set to 0.01 microns.

Referring to FIG. 6, on the first grating 30, the first pattern 31 and the plurality of second patterns 33 are collectively defined as a pattern portion 310, and intervals between the first pattern 31 and the adjacent second patterns 33 and intervals between the every two adjacent second patterns 33 are defined as blank portions 320. Both the pattern portion 310 and the blank portion 320 can transmit light, t, but cannot transmit light at the same time. That is, when the pattern portion 310 transmits light, the blank portion 320 does not transmit the light. When the pattern portion 310 blocks light, the blank portion 320 allows the light to pass.

In this embodiment, the second grating 40 is also provided in the same design as the first grating 30, and the pattern portion 310 is opaque to form a color difference, so that an image of the pattern portion 310 is easily to be recognized on the image sensing chip 50. For example, the first pattern 31 and the plurality of second patterns 33 are formed by coating black paint on surfaces of the first grating 30 and the second grating 40. The blank portion 320 is transparent. It can be understood that when only the first pattern 31 is provided on the first grating 30 or the second grating 40, the areas other than the first pattern 31 are all defined as the blank portion 320.

In this embodiment, the first pattern 31 and the plurality of second patterns 33 are grooves of different shapes formed on the first grating 30 and the second grating 40. When the first pattern 31 and the plurality of second patterns 33 are grooves, the black paint is printed on a bottom surface of each groove.

The first pattern 31 is can be a diamond-shaped groove. In this embodiment, the first pattern 31 is a diamond-shaped groove, and a length of a diagonal of the diamond-shaped groove may be set to 0.012 micrometers. The plurality of second patterns 33 are square grooves. A side length of the square groove may be set to 0.01 micrometers.

Figure 5:
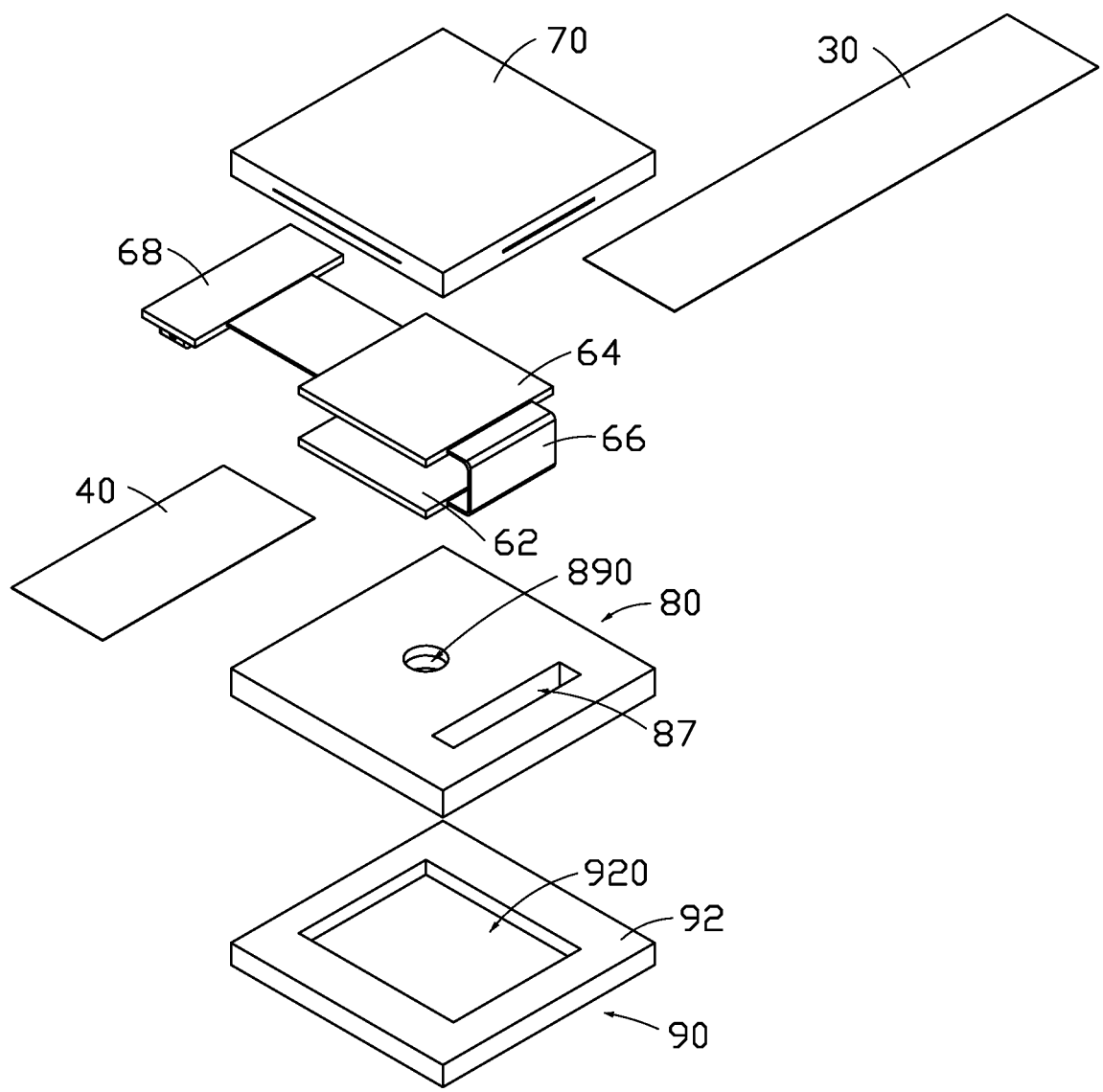
FIG. 5 is another exploded view of the grating measuring module comprised in the three-dimensional image sensing apparatus in accordance with one embodiment.

In this embodiment, the grating measuring module 100 further includes a printed circuit board 60 (shown in FIG. 7). Referring to FIGS. 4 and 5, the printed circuit board 60 includes a first circuit board 62, a second circuit board 64, a flexible connection portion 66 vertically connecting the first circuit board 62 and the second circuit board 64, and an extension portion 68 connected to the first circuit board 62. The first circuit board 62 and the second circuit board 64 are disposed opposite to each other. The image sensing chip 50 is disposed on the first circuit board 62. The light source 10 is disposed on the second circuit board 64, and the extension portion 68 is provided with an electrical connector 680. The electrical connector 680 implements signal transmission between the grating measuring module 100 and an external electronic device (not shown).

In this embodiment, the grating measuring module 100 further includes a base 70. The base 70 includes an upper surface 71, a lower surface 72, a front side surface 73 connecting the upper surface 71 and the lower surface 72, a left surface 74 connecting the upper surface 71 and the lower surface 72, and a right surface 75 connecting the upper surface 71 and the lower surface 72. The upper surface 71 is recessed toward the lower surface 72 to form a receiving groove 701. The front side surface 73 defines a through hole 703, the through hole 703 communicates with the receiving groove 701, and the first circuit board 62 is disposed on the receiving groove 701.

Figure 2:
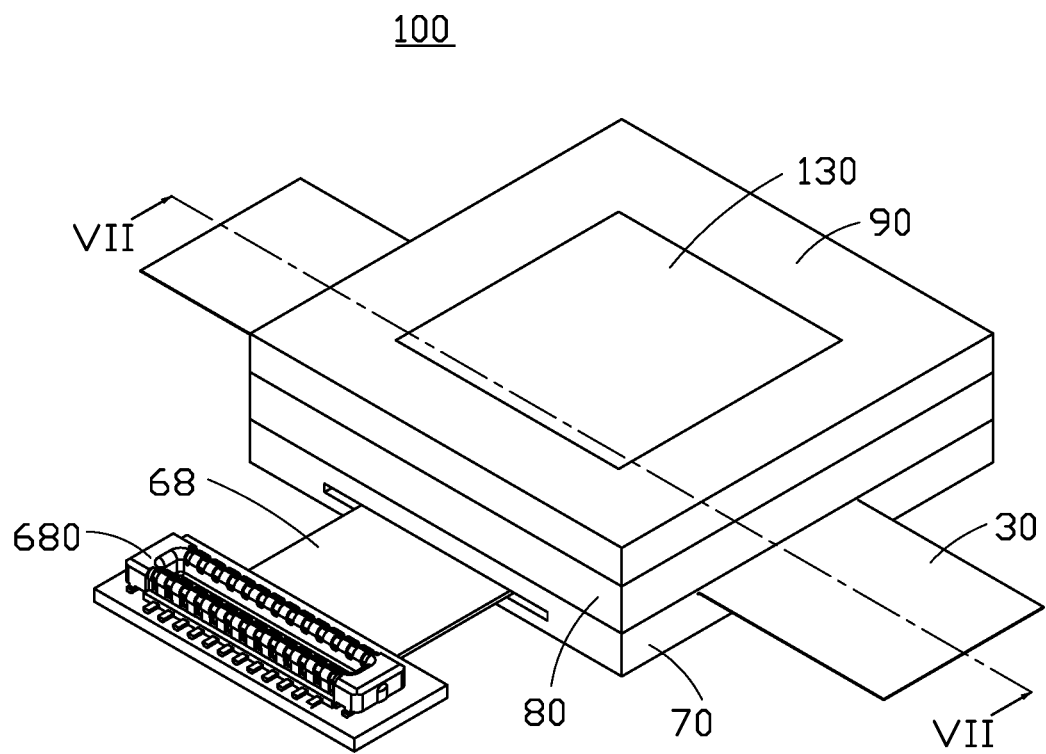
FIG. 2 is an isometric view of a grating measuring module comprised in three-dimensional image sensing apparatus in accordance with one embodiment.
Figure 3:
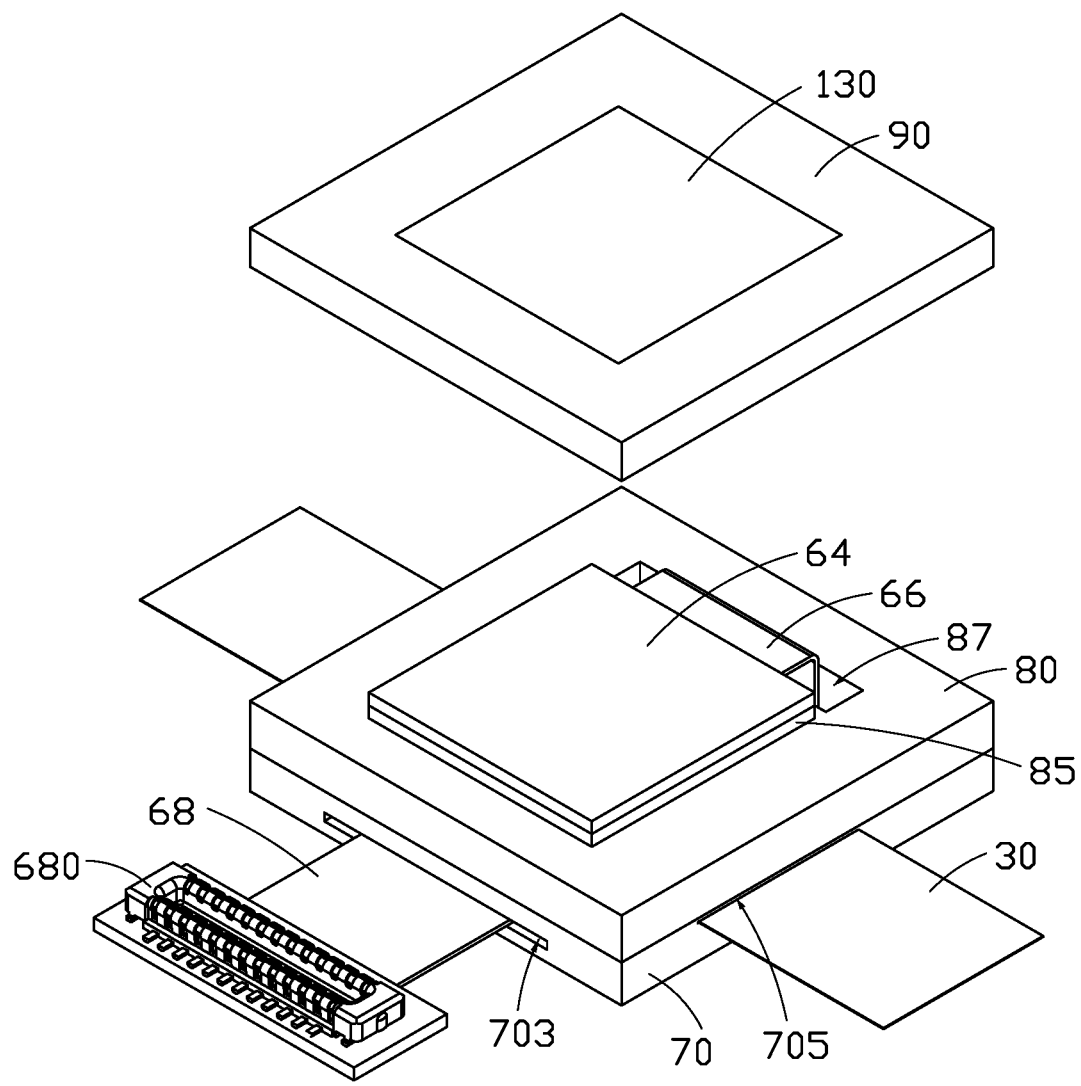
FIG. 3 is an isometric view of the grating measuring module when removing the cover in accordance with one embodiment.

Referring to FIG. 1 and FIG. 2, when the printed circuit board 60 is disposed on the base 70, the extension portion 68 protrudes from the through hole 703 to an outside of the receiving groove 701. The base 70 further includes a slot 705. The slot 705 extends from the left surface 74 to the right surface 75, and the first grating 30 and the second grating 40 are inserted from the slot 705, both ends of the first grating 30 and the second grating 40 are located outside the slot 705. The second grating 40 may be fixed to the slot 705, and the first grating 30 can move relative to the second grating 40. The first grating 30 and the second grating 40 may also be fixed to two objects that can move relative to each other.

In this embodiment, the grating measuring module 100 further includes a supporting frame 80 mounted on the base 70, and the supporting frame 80 includes a first surface 81 facing the base 70, a second surface 83 opposite the first surface 81, and a projection 85 protruding from the second surface 83. The supporting frame 80 is provided with a strip groove 87 located on one side of the projection 85. A step portion 89 is formed at a center of the projection 85 and a light-passing hole 890 is formed at a center of the step portion 89. The light-passing hole 890 includes a bearing surface 892. The collimating device 20 is disposed on the bearing surface 892. The flexible connection portion 66 passes through the strip groove 87 so that the second circuit board 64 faces the second surface 83. The light source 10 is mounted on the second circuit board 64 and located on the step portion 89, so that the light emitted from the light source 10 can be transmitted to the image sensing chip 50 through the light-passing hole 890, to form the image on the image sensing chip 50.

In this embodiment, the grating measuring module 100 further includes a cover 90. Referring to FIG. 5, the cover 90 includes a bottom surface 92 facing the supporting frame 80. The bottom surface 92 is recessed with a recessed portion 920. The second circuit board 64 is received in the recessed portion 920.

Referring to FIG. 4, a display screen 130 may be embedded in the cover 90. The data processing unit 120 transmits a result of calculation to the display screen 130 through an electrical connection or wireless transmission. The display screen 130 is used to conveniently display a displacement calculated by the data processing unit 120.

In summary, since the micro-displacement measurement device 200 provided by the present disclosure includes the first grating 30 and the second grating 40, when the micro-displacement measurement device 200 is in use, the first grating 30 and the second grating 40 are respectively fixed to two objects that can move relative to each other.

When the first grating 30 is moved relative to the second grating 40, the light emitted from the light source 10 passes through the collimating device 20, the first grating 30, and the second grating 40 to form the image on the image sensing chip 50.

In an initial position, the first pattern 31 of the first grating 30 and the first pattern 31 of the second grating 40 are aligned, as shown in the image P1 in FIG. 8.

When the first grating 30 and the second grating 40 are misaligned by displacement, the first pattern 31 of the first grating 30 and the first pattern 31 of the second grating 40 are staggered, as shown in the image P2 in FIG. 8.

Where, the two images P1 and P2 in FIG. 8 omit a plurality of pixels in the images for clearly displaying the first pattern 31 and the second patterns 33. In fact, both images are full of pixels. A distance between the first pattern 31 of the first grating 30 and the first pattern 31 of the second grating 40 represents the displacement between the first grating 30 and the second grating 40, a sum of all sizes of the second patterns 33 between the two first patterns 31 and all the pitches between the two first patterns 31 is a total displacement.

The image processing unit 110 is configured to receive images from the image sensing chip 50 and process the images to obtain numbers of pixels between the two first patterns 31.

In the data processing unit 120, a proportionality between the pixels and the patterns of an image is established. The image processing unit 110 can determine how many pixels are included between the first pattern 31 of the first grating 30 and the first pattern 31 of the second grating 40 of the image, so as to establish the number of pixels between the first pattern 31 of the first grating 30 and the first pattern 31 of the second grating 40. The data processing unit 120 calculates the displacement according to the number of pixels and the proportionality between the pixels and the patterns of the image processing unit 110, the displacement is displayed on the display screen 130.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the portions within the principles of the present disclosure, up to and including the full extent established by the broad general meaning of the terms used in the claims. It will therefore be appreciated that the embodiments described above may be modified within the scope of the claims.

What is claimed is:

1. A grating measuring module, comprising:
a light source;
a collimating device arranged on an optical path of the light source;
a first grating arranged on an optical path of the collimating device;
a second grating arranged on an optical path of the first grating, wherein the first grating and the second grating respectively comprise a first pattern and a plurality of second patterns locating on a left and right sides of the first pattern, one of the first grating and the second grating is able to move relative to the other one to cause a displacement; and
an image sensing chip arranged on an optical path of the second grating, wherein light emitted from the light source forms an image on the image sensing chip after passing through the collimating device, the first grating, and the second grating.

2. The grating measuring module of claim 1, wherein:
a first pitch between the first pattern and an adjacent second pattern is equal to a second pitch between every two adjacent second patterns.

3. The grating measuring module of claim 2, wherein:
the first pattern and the plurality of second patterns together are defined as a pattern portion, and intervals between the first pattern and the adjacent second patterns and intervals between the every two adjacent second patterns are defined as a blank portion, one of the pattern portion and the blank portion is able to transmit light, and the other one is opaque.

4. The grating measuring module of claim 2, wherein:
the first pattern and the plurality of second patterns are grooves of different shapes formed on the first grating and the second grating.

5. The grating measuring module of claim 4, wherein:
the first pattern is a diamond groove.

6. The grating measuring module of claim 5, wherein:
the plurality of second patterns are square grooves or circular grooves.

7. The grating measuring module of claim 6, wherein
the first pattern and the plurality of second patterns are formed by coating black paint on surfaces of the first grating and the second grating.

8. The grating measuring module of claim 1, further comprising:
a printed circuit board, the printed circuit board comprising a first circuit board, a second circuit board, a flexible connection portion vertically connecting the first circuit board and the second circuit board, and an extension portion connected to the first circuit board, wherein the first circuit board and the second circuit board are disposed opposite to each other, the image sensing chip is disposed on the first circuit board, the light source is disposed on the second circuit board, and the extension portion is provided with an electrical connector.

9. The grating measuring module of claim 8, future comprising:
a base, the base comprising an upper surface, a lower surface, a front side surface connecting the upper surface and the lower surface, a left surface connecting the upper surface and the lower surface, and a right surface connecting the upper surface and the lower surface, wherein the upper surface is recessed toward the lower surface to form a receiving groove, the front side surface is defined through hole, the through hole communicates with the receiving groove, and the first circuit board is disposed on the receiving groove.

10. The grating measuring module of claim 9, further comprising:
a supporting frame mounted on the base, the supporting frame comprising a first surface facing the base, a second surface opposite to the first surface, and a projection protruding from the second surface, wherein the supporting frame is provided with a strip groove located on one side of the projection, a step portion is formed at a center of the projection and a light-passing hole is formed at a center of the step portion, the light-passing hole comprises a bearing surface, the collimating device is disposed on the bearing surface, the flexible connection portion passes through the strip groove and the second circuit board faces the second surface, the light source is mounted on the second circuit board and located on the step portion.

11. The grating measuring module of claim 10, further comprising:
a cover, the cover comprising a bottom surface facing the supporting frame, wherein the bottom surface is recessed with a recessed portion, the second circuit board is received in the recessed portion.

12. The grating measuring module of claim 11, further comprising:
a display screen embedded in the cover.

13. A micro-displacement measurement device, comprising:
a grating measuring module comprising:
a light source;

a collimating device arranged on an optical path of the light source;

a first grating arranged on an optical path of the collimating device;

a second grating arranged on an optical path of the first grating, wherein the first grating and the second grating respectively comprise a first pattern and a plurality of second patterns locating on a left and right sides of the first pattern, one of the first grating and the second grating is able to move relative to the other one to cause a displacement; and an image sensing chip arranged on an optical path of the second grating, wherein light emitted from the light source forms an image on the image sensing chip after passing through the collimating device, the first grating, and the second grating;

an image processing unit configured to receive the image from the image sensing chip and process the image; and a data processing unit configured to output the displacement according to a result output from the image processing unit.

14. The micro-displacement measurement device of claim 13, wherein:

a proportional relationship between pixels and patterns of the image is established.

15. The micro-displacement measurement device of claim 14, wherein:

a first pitch between the first pattern and an adjacent second pattern is equal to a second pitch between every two adjacent second patterns.

16. The micro-displacement measurement device of claim 15, wherein:

the first pattern and the plurality of second patterns together are defined as a pattern portion, and intervals between the first pattern and the adjacent second patterns and intervals between the every two adjacent second patterns are defined as a blank portion, both the pattern portion and the blank portion can transmit light, but cannot transmit light at the same time.

17. The micro-displacement measurement device of claim 16, wherein:

the first pattern and the plurality of second patterns are grooves of different shapes formed on the first grating and the second grating.

18. The grating measuring module of claim 17, wherein:

the first pattern is a diamond groove, a trapezoidal groove, a triangle groove, a pentagram groove, or a circular groove, the plurality of second patterns are square grooves or circular grooves.

\* \* \* \* \*